US005383049A

United States Patent [19]

Carr

[11] Patent Number: 5,383,049

[45] Date of Patent: Jan. 17, 1995

[54] ELLIPTICALLY POLARIZING ADJUSTABLE PHASE INSERTION DEVICE

[75] Inventor: Roger Carr, Redwood City, Calif.

[73] Assignee: The Board of Trustees of Leland Stanford University, Stanford, Calif.

[21] Appl. No.: 16,064

[22] Filed: Feb. 10, 1993

[51] Int. Cl.[6] .................... G02B 1/08

[52] U.S. Cl. .................... 359/283; 372/37

[58] Field of Search .................... 359/280, 281, 282, 283; 372/37, 27, 33; 378/145

[56] References Cited

U.S. PATENT DOCUMENTS

| | | | |
|---|---|---|---|
| 4,035,741 | 7/1977 | Crisp | 372/37 |
| 4,730,334 | 3/1988 | Collins | 372/37 |
| 4,971,945 | 11/1990 | Takemura | 372/37 |
| 4,987,574 | 1/1991 | Rowley | 372/37 |
| 5,111,330 | 5/1992 | Van Delden | 359/281 |
| 5,245,621 | 9/1993 | Leupold | 372/37 |

*Primary Examiner*—Eugene R. LaRoche
*Assistant Examiner*—A. Zarabian
*Attorney, Agent, or Firm*—McCubbrey, Bartels & Ward

[57] ABSTRACT

An insertion device for extracting polarized electromagnetic energy from a beam of particles is disclosed. The insertion device includes four linear arrays of magnets which are aligned with the particle beam. The magnetic field strength to which the particles are subjected is adjusted by altering the relative alignment of the arrays in a direction parallel to that of the particle beam. Both the energy and polarization of the extracted energy may be varied by moving the relevant arrays parallel to the beam direction. The present invention requires a substantially simpler and more economical superstructure than insertion devices in which the magnetic field strength is altered by changing the gap between arrays of magnets.

5 Claims, 2 Drawing Sheets

ELLIPTICALLY POLARIZING ADJUSTABLE PHASE INSERTION DEVICE

This invention was made with the support of the United States Government under Grant No. DE-AC03-76SF-00515 awarded by the Department of Energy, Office of Basic Energy Sciences, Division of Materials Science. The United States Government has certain rights in this invention.

FIELD OF THE INVENTION

The present invention relates to devices for extracting energy from charged particle beams, and more particularly, to an improved magnetic insertion device.

BACKGROUND OF THE INVENTION

The use of insertion devices such as undulators and wigglers with charged particle beams for the generation of electromagnetic radiation, particularly x-rays, has become increasingly common in recent years. A prior art insertion device typically consists of two linear arrays of magnets located on opposite sides of a portion of a beam of relativistic charged particles. As the particles pass between the magnets, the particles are subjected to an alternating magnetic field which causes the particles to be accelerated in directions transverse to the beam direction. This alternating acceleration causes the particles to emit electromagnetic radiation. The shape of the energy spectrum of the emitted radiation depends on the number and amplitude of oscillations to which the beam is subjected and the detailed arrangement of the magnets in the arrays. The amplitude of the oscillations depends on the magnetic field strength in the region between the arrays of magnets.

It is often advantageous to provide a source of x-rays whose polarization and characteristic energy may be varied. X-ray sources are useful in both spectroscopic and fixed energy applications. In imaging applications, it is often advantageous to construct an image by subtracting two component images that were generated by illuminating the specimen with radiation having different polarizations. Similarly, measurements of the magnetic dichroism of materials such as magnetic recording media require measurements of the response of the specimen to radiation having different polarizations. Usually, the differential measurements are made using radiation having either left or right handed circular polarization. To obtain the maximum contrast, the radiation source must provide radiation which is substantially of one polarization.

The optimum energy for the radiation source will, in general, depend on the experiment being performed. Hence, it is advantageous to provide a radiation source in which the energy of the source may be varied. In general, the x-ray energy is varied by varying the magnetic field strength in the insertion device or by varying the energy of the charged particles in the beam. In the prior art systems in which the magnetic field strength is varied, the field strength is adjusted by employing electromagnets and varying the current therein or by employing permanent magnets and varying the distance between the two rows of magnets. Permanent magnets have been found to be more attractive than electromagnets because they provide high field density without the need for cooling.

The need to vary the gap in permanent magnet systems leads to structural and mechanical problems. The new generations of x-ray sources may require insertion devices of 5 meters or longer with gaps less than 30 min. In addition to the problems of moving and aligning a device of this size which may weigh several tons, the positioning apparatus must withstand the force of attraction between the two rows of magnets. For example, an exemplary 4 meter insertion device with a minimum gap of 30 mm must resist forces in excess of 91 kN. The structural and mechanical problems inherent in providing a means for controlling the positioning and alignment of such a device will be apparent to those skilled in the mechanical arts.

Prior an systems for generating elliptically polarized x-rays have various limitations as to purity of polarization and as to flux. Quarter wave plate and related techniques are limited as to the range of energies at which they may be used. Bending magnet techniques, the most common in use, display sharply decreasing flux at higher rates of circular polarization. Variable gap insertion device techniques may suffer from certain mechanical and electron optical complications. Mechanical complications arise from the requirement that the gap variation must be done with great precision against very large forces. Electron optical effects include susceptibility to very large forces. Electron optical effects include susceptibility to horizontal beam steering errors and tune shifts due to changes of vertical electron beam focusing with gap.

Broadly, it is the object of the present invention to provide an improved insertion device.

It is a further object of the present invention to provide an insertion device that utilizes permanent magnets while avoiding the mechanical and structural problems inherent in controlling the gap between the two rows of magnets.

It is yet another object of the present invention to provide an insertion device which allows the energy and polarization of the generated radiation to be changed without changing the gap between the rows of magnets.

It is still a further object of the present invention to provide an insertion device that minimizes variations in the vertical focusing or horizontal steering to the particle beam when the magnetic field to which the particles are subjected is altered.

These and other objects of the present invention will become apparent to those skilled in the art from the following detailed description of the invention and the accompanying drawings.

SUMMARY OF THE INVENTION

The present invention comprises an insertion device for extracting energy from a beam of particles. The invention includes first, second, third, and fourth linear arrays of magnets which are supported in pairs on opposite sides of the beam of charged particles. The linear arrays are substantially aligned with the beam direction. The invention adjusts the magnetic field strength to which the beam of particles is subjected by altering the relative alignment of the two of the arrays with respect to the other arrays in a direction substantially parallel to that of the particle beam. Both the polarization and energy of the extracted electromagnetic energy may be varied appropriate displacements of the arrays relative to one another.

DETAILED DESCRIPTION OF THE INVENTION

The present invention will be described in terms of a system for generating x-rays from a charged particle beam. However, it will be apparent to those skilled in the art that the invention may be used in other applications in which energy is to be extracted from a particle beam.

Figure 1:
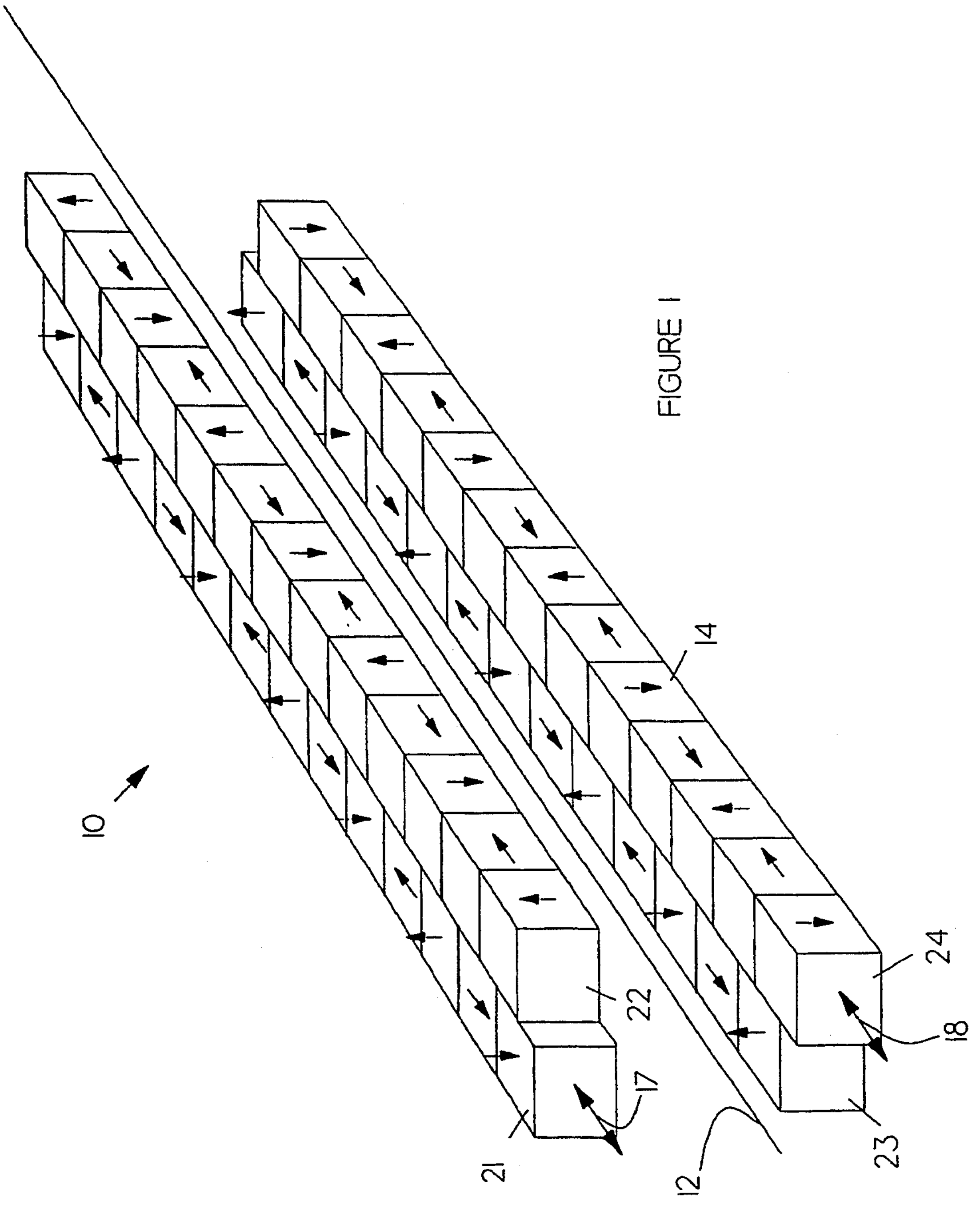
FIG. 1 illustrates the geometric arrangement of magnets in an insertion device.

The present invention may be more easily understood with reference to FIG. 1 which illustrates the general geometric configuration of the preferred embodiment of an insertion device 10 according to the present invention relative to a charged particle beam 12. Insertion device 10 is constructed from four linear arrays of magnets 21-24. Each array includes a plurality of magnets of which 14 is exemplary. The arrows shown on each of the magnets show the direction of the easy axis of magnetization created by the magnet in question. The general configuration shown in FIG. 1 is for purposes of illustration only. The arrangement is similar to that taught by Halbach (Nucl. Instr. and Meth., 187, p.109 1981) for a two linear array insertion device; however, as will be discussed in more detail below, the precise arrangement of the magnets may vary from that shown in FIG. 1 without departing from the teachings of the present invention. For the purpose of the present discussion, it is sufficient to note that the preferred embodiment of each linear array of magnets includes a periodic arrangement of the magnets. The arrays shown in FIG. 1 each have a period consisting of 4 magnets. The distance from the start of one period to the beginning of the next will be referred to as the period length of the linear array.

The present invention utilizes shifts in the longitudinal alignment of the magnet arrays to change the strength and configuration of the magnetic fields to which the particles are subjected. The rows of magnets are mounted such that each row may be made to slide parallel to beam line 12. It may be shown that if diagonally opposite rows (i.e., linear arrays 21 and 24) of magnets in the configuration shown in FIG. 1 are shifted with the other rows (i.e., rows 22 and 23) fixed, that elliptically polarized radiation will be generated. This type of motion is indicated at 17 and 18. When the offset is zero, i.e., rows 21-24 are all aligned, the radiation generated by insertion device 10 is linearly polarized. As the offset increases the radiation becomes elliptically polarized. When the offset reaches a predetermined fraction of the period length of the linear arrays, the radiation generated will be circularly polarized. When the offset reaches 0.5 of the period length of the linear arrays, the radiation generated will again be linear polarized: however, the direction of polarization will be at 90 degrees to that of the radiation generated at zero offset.

Consider the case in which the linear arrays are moved relative to each other in the direction opposite to that discussed above. When the offset is increased to the predetermined fraction of the period length of the linear arrays mentioned above, the polarization of the generated radiation will once again be circular; however, the sense of the circular polarization will be opposite to that of the radiation generated at the first fraction described above. In general, the fraction mentioned above will depend on the details of the magnet arrangements.

The energy of the radiation generated by insertion device 10 may be varied by moving the bottom two linear arrays 23 and 24 parallel to beam line 12 with respect to the top two linear arrays 21 and 22. In this case, the offset of linear array 21 relative to linear array 22 is held constant. Similarly, the offset of linear array 23 relative to linear array 24 is held constant.

The energy of the radiation generated by insertion device 10 may also be varied by moving linear arrays 21 and 23 parallel to beam line 12 with respect to linear arrays 22 and 24. In this case, the offset of linear array 21 relative to linear array 23 is held constant. Similarly, the offset of linear array 22 relative to linear array 24 is held constant.

As noted above, to change the energy of the generated radiation with prior art insertion devices, the distance between the rows of magnets must be changed. In contrast, the present invention does not require this distance to be changed. The mechanical structures needed to control and change the positions of the linear arrays parallel to the beam line 12 are considerably less expensive than those needed to change the distance between the arrays of magnets and beam line 12. In the present invention, the force between the opposing rows of magnets may be supported on fixed supports as discussed below. In prior art systems, this force must be supported by the positioning mechanism. As noted above, the forces in question are very large; hence, the need to control the spacing with the positioning mechanism significantly increases the cost of prior art devices relative to the present invention.

Figure 3:
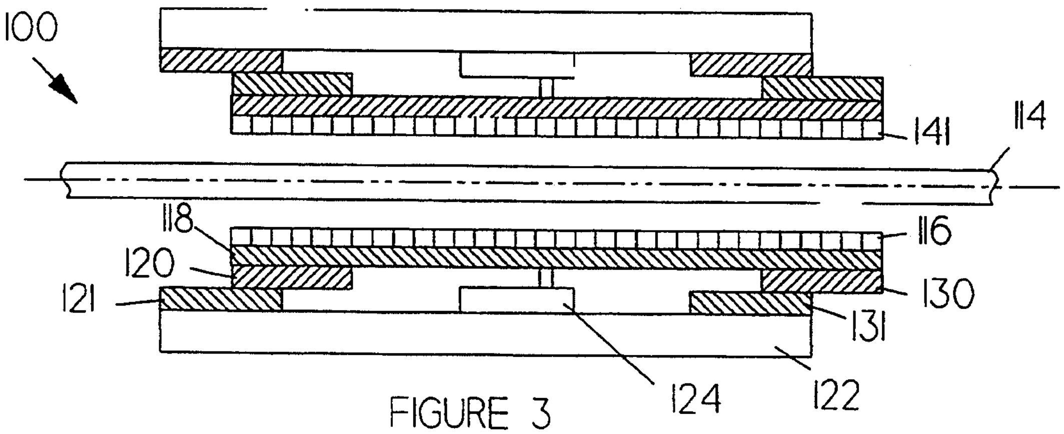
FIG. 3 is a cross-sectional view of an insertion device according to the present invention.
Figure 2:
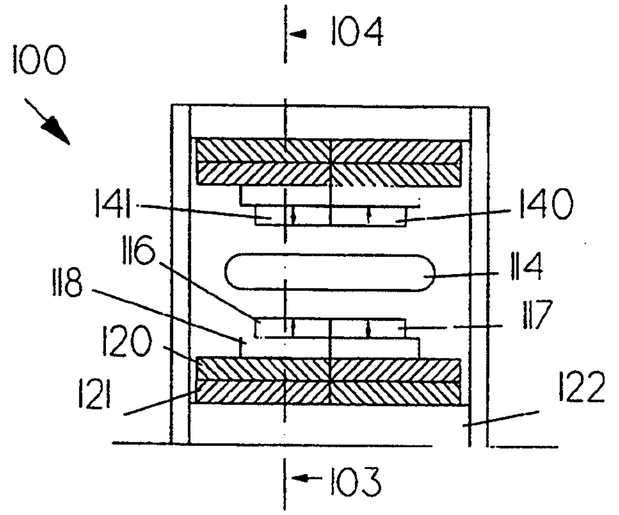
FIG. 2 is an end view of an insertion device according to the present invention.

FIGS. 2 and 3 are more detailed schematic drawings of the preferred embodiment of an insertion device 100 according to the present invention. FIG. 2 is an end view of insertion device 100, and FIG. 3 is a cross-sectional view of insertion device 100 through line 103-104 shown in FIG. 2. Insertion device 100 utilizes two top arrays of magnets 140 and 141 and two bottom arrays of magnets shown at 117 and 118. The particle beam moves between the arrays in an evacuated beam tube 114. The magnet arrays are mounted on structural supports. An exemplary structural support is shown at 118. Structural support 118, in turn is mounted on slides shown at 120, 121, 130, and 131. The position of structural support 118 is set with the aid of linear actuator 124. The various slides are supported on base elements of which base element 122 is exemplary. At least three of the magnet arrays must be moveable relative to beam pipe 114. The actuator mechanisms for the other moveable arrays are essentially the same as that described with respect to array 116, and hence, will not be discussed further here.

As noted above, the arrangement of the magnets in the magnet arrays determines the characteristics of the energy spectrum and polarization of the emitted x-rays. In general, the optimum spectrum will depend on the application in which the x-rays are to be used. For the purposes of this invention, there are only two constraints on the magnetic arrays. First, the arrangement of magnets must generate a magnetic field that changes direction at least twice during the traversal of the insertion device by the particle beam. Second, the magnetic field strength to which the particles are subjected during their traversal of the insertion device changes with the relative longitudinal alignment of the arrays. It should also be noted that an arrangement having more than four arrays of magnets will be apparent to those skilled in the art.

Various modifications to the present invention will become apparent to those skilled in the art from the foregoing description and accompanying drawings. Accordingly, the present invention is to be limited solely by the scope of the following claims.

What is claimed is:

1. An insertion device for extracting electromagnetic energy from a beam of charged particles, said electromagnetic energy being characterized by its polarization and energy said insertion device comprising:

a first, second, third, and fourth linear array of magnets, each said linear array comprising a plurality of magnets;

means for supporting said first and second linear arrays on the opposite side of said beam of charged particles from said third and fourth linear arrays, said first, second, third, and fourth linear arrays being substantially aligned with said beam of particles; and means for moving at least two of said linear arrays in a direction parallel to said beam of charged particles so as to change the polarization or energy of said extracted electromagnetic energy.

2. The insertion device of claim 1 wherein the polarization of said extracted electromagnetic energy is changed by moving a first pair of said linear arrays relative to said linear arrays that are not included in said first pair.

3. The insertion device of claim 2 wherein the energy of said extracted electromagnetic energy is changed by moving a second pair of said linear arrays relative to said linear arrays that are not included in said second pair, said first pair of linear arrays including at least one linear array not included in said second pair of linear arrays.

4. The insertion device of claim 1 wherein each said linear array of magnets comprises a repeating sequence of magnets.

5. A method for adjusting the magnetic field strength in an insertion device for extracting energy from a beam of charged particles, said insertion device comprising first, second, third, and fourth linear arrays of magnets, said first and second linear arrays of magnets being arranged on the opposite side of said beam of charged particles from said third and fourth linear arrays of magnets, said first, second, third, and fourth linear arrays of magnets being substantially aligned with said beam of charged particles, said method comprising the step of altering the alignment of said first and second linear arrays of magnets relative to said third and fourth linear arrays of magnets in a direction substantially parallel to that of said beam of charged particles.

* * * * *